Figure 1:
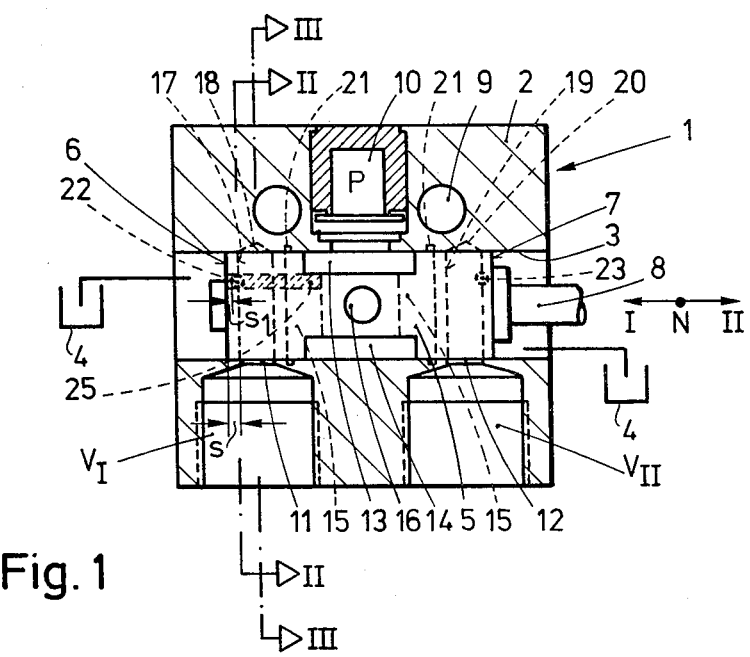

United States Patent [19]

Brunner

[11] 4,453,453

[45] Jun. 12, 1984

[54] HYDRAULIC CONTROL DEVICE

[75] Inventor: Rudolf Brunner, Baldham, Fed. Rep. of Germany

[73] Assignee: Heilmeier & Weinlein Fabrik Fuer Oel-Hydraulik GmbH & Co. KG., Fed. Rep. of Germany

[21] Appl. No.: 272,184

[22] Filed: Jun. 10, 1981

[30] Foreign Application Priority Data

Jun. 16, 1980 [DE] Fed. Rep. of Germany ....... 3022592

[51] Int. Cl.³ .......................................... F15B 13/042
[52] U.S. Cl. ................... 91/451; 137/596.13; 137/625.68
[58] Field of Search ................... 91/466, 451; 137/625.68, 596, 13, 625.67

[56] References Cited

U.S. PATENT DOCUMENTS

| | | | |
|---|---|---|---|
| 2,603,192 | 7/1952 | Kensok | 137/625.68 |
| 2,615,433 | 10/1952 | Deardorft et al. | 91/466 |
| 2,617,257 | 11/1952 | Douglas | 91/466 |
| 2,951,505 | 9/1960 | Hare | 137/625.68 |
| 2,987,050 | 6/1961 | Oppenheimer et al. | 91/466 |
| 2,998,828 | 9/1961 | Hare | 137/625.68 |
| 3,020,927 | 2/1962 | McLaughlin | 137/625.68 |
| 3,221,770 | 12/1965 | Faisandier | 91/466 |
| 3,398,650 | 8/1968 | Garnjost | 137/596.13 |
| 3,596,560 | 8/1971 | Butterworth | 137/625.68 |
| 3,820,568 | 6/1974 | Brunner et al. | 137/625.68 |
| 4,089,169 | 5/1978 | Miller | 137/596.13 |
| 4,301,837 | 11/1981 | Brunner | 137/625.68 |
| 4,323,087 | 4/1982 | Brunner | 137/625.68 |

Primary Examiner—Robert E. Garrett
Assistant Examiner—Richard L. Klein
Attorney, Agent, or Firm—Kinzer, Plyer, Dorn & McEachran

[57] ABSTRACT

A hydraulic control device for a hydraulic working cylinders, comprising a slide control valve, in which the flow of working pressure medium is controllable by a piston slide displaceable within a housing bore auxiliary control passage connected to the housing of the slide control valve in which a bore leads to the housing bore, the bore discharging into a longitudinal section of the housing bore which is swept by ends of the piston slide. The discharge of the bore is connectable to a selected control position by the control edge and is connectable with the housing bore, which is connected in this section with a pressure medium reservoir or a return flow passage.

6 Claims, 4 Drawing Figures

HYDRAULIC CONTROL DEVICE

This invention relates to a hydraulic control device.

From German Auslegesschrift 20 30 382 a hydraulic control device is known, in which several interconnected slide control valves control a hydraulic working cylinder in a crane with the working pressure medium supplied respectively from the discharge of pressure working medium in a return pressure passage. Several auxiliary control pipes serve for pre-control of the slide control valves with associated auxiliary valves, so that a load moment limit is given for at least one of the working cylinders. As soon as an increase of a signal pressure fulfils the load limit, measures are instituted which prevent the working cylinder leading to exceeding the load limit and thus leading to adjustment movement. For this purpose at any given time a working pressure supply from an auxiliary control passage is tapped and excess pressure medium discharged through an auxiliary valve, which is subject to the signal pressure, into the return flow passage. Simultaneously, through this auxiliary control passage the stated auxiliary control circuit is relieved of pressure, whereupon another auxiliary valve short circuits the main pressure supply directly with the return flow passage. No useful pressure is then maintained at the slide control valves.

Each auxiliary control passage leads through an inlet bore to the housing bore of the slide control valve and from this through an outlet bore and a further pipe line either to an auxiliary valve or to a return flow passage. In the piston slide of each piston slide valve, a control channel is provided, which in a predetermined location of the piston slide connects the inlet bore with the outlet bore for the auxiliary control passage and establishes the pressure medium of the auxiliary control passage with a through flow. This means, that both the housing of the slide control valve and also the piston slide itself must have for this function a corresponding construction. The known principle is disadvantageous in as far as a higher technical expenditure for the manufacture of the slide control valve is necessary, since the additional provision both of the inlet and outlet bores of the auxiliary control passage and also the control channel in the piston slide increases the length of the housing, the housing bore length and the piston slide length substantially. In addition it must be ensured that the control channel in the position slide cannot be intersected with any other channels for the control of the working pressure medium or the outflow thereof, if necessary with an unrestricted circulation or for pressure equalisation at the piston slide, if the piston slide is moved into its control positions. Further, both sides of the control channel in the piston slide must be made with a cover zone or respectively a sealing zone, so that, where appropriate, no pressure medium leaking from the working pressure passages can undesirably flow into the auxiliary control passage and there under certain circumstances give rise to an undesired build-up of pressure. There cannot therefore be incorporated any conventional piston slide, but it must alone on the basis of the additional problem relative to the pressure control in the auxiliary control passage be replaced by specially conceived and constructed slide control valve taking into account these problems. The constructional size and the technical expenditure for such slide control valves is not on this account particularly great, but since the auxiliary control passages of the known principle must be strengthened with the tapping of the working pressure requirements for large quantities of pressure medium, large cross-sections and a satisfactory sealing in the slide control valve become necessary.

According to the present invention, there is provided a hydraulic control device for a hydraulic working cylinder, comprising a slide control valve, in which the flow of working pressure medium is controllable by a piston slide displaceable within a housing bore into control positions, at least one auxiliary control passage, which is connected to the housing of the slide control valve, in which a bore leads to the housing bore, said bore discharging into a longitudinal section of the housing bore which is swept by ends of the piston slide controlling in themselves the direct working pressure medium flow during adjustment motion between control positions, the discharge of the bore being so arranged that it is exclusively connectable during an adjustment of the piston slide into a selected control position by the control edge forming ends of the piston slide and is connectable with the housing bore, which is connected in this section with a pressure medium reservoir or a return flow passage, and for the release or closure of the discharge opening of the bore the end of the piston slide is used, which in itself is adapted for the control of the working pressure medium flow from or to the working cylinder.

In this construction a control channel in the piston slide becomes superfluous, since the piston slide alone effects with its ends a release or a closure of the bore of the auxiliary control passage. As soon as the connecting bore of the auxiliary control passage is open, pressure medium found therein can flow out. The pressure difference generated in this manner can be used in a simple manner to control an auxiliary valve or a further auxiliary member. Since no outlet bore in the housing of the slide control valve needs to be directed to the connecting bore of the auxiliary control passage and furthermore the piston slide does not require any control channel, the connection bore can be readily accommodated so that it does not impair the specific working functions of the slide control valve. A conventional slide control valve can be replaced with a customary piston slide, so that in spite of the additional function, which the slide control valve can undertake, no increased outer dimensions or costly construction of the housing and the piston slide will result. In a customary manner the end sections of the housing bore are taken over by the piston slide without connection to a return flow passage or a pressure medium reservoir, so that even in this case no additional measures are necessary, to provide for a satisfactory release of the pressure medium flowing out of the auxiliary control passage. The particular advantage of this construction lies in that a conventional slide control valve with a "normal" piston slide can be used, in which along by attachment of a housing bore for the closure of the auxiliary control passage an additional control function of the piston slide is achieved for the auxiliary control passage: moreover, it is possible to use available elements of the slide control valve, namely the housing bore, the end of the piston slide and a free wall zone of the housing.

A preferred constructional form of the control valve is one in which control function, which is effected for the auxiliary control passage by the slide control valve, leads rapidly to the specific working functions of the slide control valve. Of particular importance is the feature, if the auxiliary control passage is available for the solution of a protection, limiting or use function, which in a preferred manner can be made effective rapidly for actuation of the user being monitored. In special application cases it may also be preferable to release the opening of the bore of the auxiliary control passage initially if the predetermined control position of the piston slide has already been reached. Then the functions carried out by the auxiliary control passage enter at the same point in time, as the operational functions of the slide control valve in the control position of the piston slide.

With a control device having a slide control valve associated with two users, for example a double-acting hydraulic cylinder, in which the piston slide is displaceable from a neutral position into two control positions, it supplies at any given time one user with working pressure and draws from the other user, working pressure to the housing bore connected with a return flow passage. With this construction it is ensured that the piston slide in any control position releases pressure in an auxiliary control passage, so that this renders operative a control process or is prepared for such a control process. In a hydraulic control device, which in the slide control valve in the piston slide flow pockets and through flow bores for a flow guidance of the working pressure medium and unrestricted through passage and if necessary for a pressure equalisation at the piston slide are provided, the following features are to be preferred, namely, the arrangement of the bores auxiliary control in such a manner that they discharge into a special longitudinal or respectively peripheral zone of the housing bore, which ensures that they will not communicate with channels provided in the piston slide for the flow of the working pressure medium. The opening at any given time of a bore is effected only exactly at the predetermined instant in time, which the control edge or the end of the piston slide is drawn from the bore opening.

For a hydraulic control device according to the invention, in which a control valve arrangement is provided connected to a common main supply pipe to several series-connected slide control valves of which it is possible to actuate at least one hydraulic cylinder, it is preferable to embody a common auxiliary control pipe and its branch pipes whereby the whole control valve arrangement may be so monitored that exhaust of pressure in the auxiliary control pipe is effected independently of whichever piston slide in whichever slide control valve is moved directly into a predetermined control position. This is thus in particular important, if a hydraulic control device must exert an overload protection, a self-limiting or an emergency function.

Another preferred constructional embodiment of the invention, is one in which the pressure release grooves take care of the pressure equalisation around the periphery of the piston slide, which otherwise inclines to jamming and either cannot be moved again or only with difficulty. In a conventional manner the pressure equalisation grooves are applied in the periphery of the piston slide. In accordance with the invention pressure equalisation grooves however are introduced into the wall of the housing bore, since otherwise the danger exists that the pressure balancing grooves would lead to an undesirable pressure drop on passing the opening of the bore of the auxiliary control passage.

A further embodiment is one by which the first auxiliary valve provides on reaching an adjustment or load limit of the working cylinder a connection between the main supply pipe and the return passage, as a result of which no further pressure admission to the working cylinder can follow. Because of this the pre-control pressure from the auxiliary control pipe is held in its closed configuration with respect to the main supply pipe, so that until reaching the load or position limit no influence whatsoever follows in the pressure supply of the slide control valve and of the working cylinder. Beyond the limiting auxiliary valve arranged downstream of the first auxiliary valve, which can be an overload or an end changeover valve, on reaching the position or load limit the through passage to the auxiliary control pipe is released, in spite of this however, the first auxiliary valve remains in its closed configuration. Only when in the following sequence the piston slide is displaced in the piston slide control valve into the control position, the adjustment position of the working cylinder would lead to excess of the adjustment or overload limit, then the through flow passage in the slide control valve is opened through which the pressure from the auxiliary control pipe exhausts into the return flow pipe. With the exhaust of the maintaining pressure the first auxiliary valve changes over into its through flow configuration, in which the main supply pipe is connected with a return flow channel, so that at the slide control valve no appreciable pressure arises. So far as the piston slide which has been actuated to effect a displacement of the working cylinder beyond the adjustment or load boundary, has been moved out of this control position, it again closes off the auxiliary control pipe, so that the first auxiliary valve is again changed over to the closing off configuration. On a further actuation of the piston slide the supply pressure from the main supply pipe again becomes usable without limit. The position limiting device necessitates only the comparatively small auxiliary control pipe designed for a small hydraulic through flow and the auxiliary valve. This valve can be constructed as a result of a comparatively low auxiliary control pressure and a small through flow simply and inexpensively, and can to advantage be directly integrated in the piston control valve. The limiting auxiliary valve is an end changeover valve, again this is preferably not attached or incorporated directly in the slide control valve, but in the working cylinder to be monitored. Although the auxiliary control pipe is lead through the piston slide in the slide control valve and the first auxiliary valve is connected to the main supply pipe, the position-limiting device does not influence the work process in the hydraulic circuit under normal operating conditions. A particular advantage results from the special construction of the conventional slide control valve with the bores provided in pairs for connection of the auxiliary control pipe(s) and the two piston slide ends incorporated for the control, and in fact particularly when the control device contains several battery-operated slide control valves for the control of several working cylinders. Such an arrangement is frequenctly used in devices in connection with a limiting device, for example in a crane with several cylinders "to be limited". Again in this respect not only slide control valves of conventional construction can be used substantially universally, which in themselves were only conceived for the control of working pressure medium flow, by incorporation of the bores in pairs for the auxiliary control channel modified in a simple manner, but slide control valves are thus modified so that they can be used substantially universally. For all users for respective working cylinders the same type of control valve can be replaced with an identical housing and piston slide.

If no control is necessary in one or two auxiliary control passages, bores in the housing will be closed off. If an auxiliary control passage is necessary for only one control function, the bore not used will be closed off. Finally, also according to requirements two bores of the auxiliary control passages can be closed off.

Summarizing, one and the same slide control valve, can be incorporated for four various control problems, for which only appropriate bores must be closed off or connected.

Figures 2, 3:
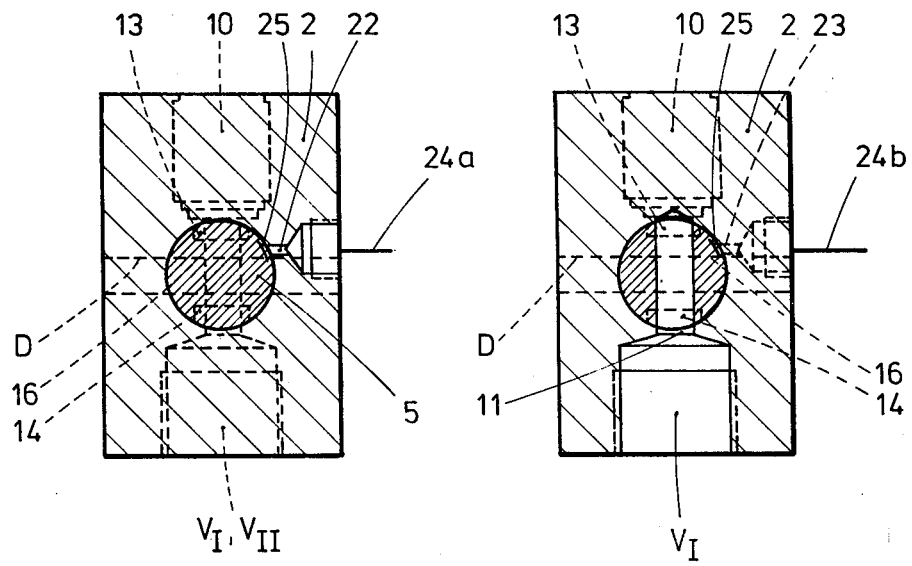
Figure 4:
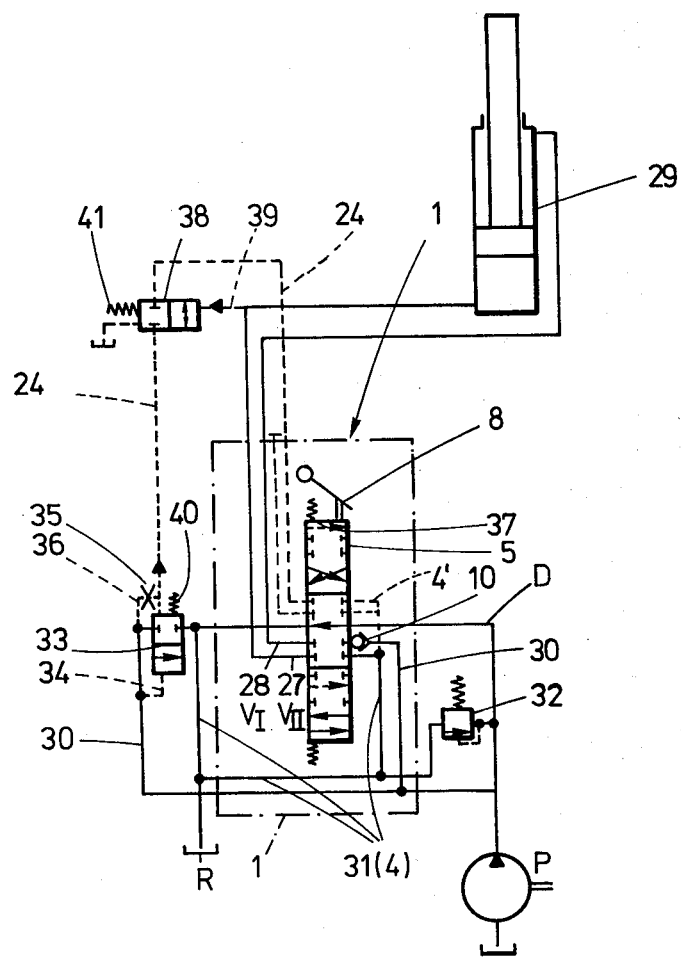

Embodiments of the invention will be hereinafter explained with reference to the drawings. There is shown in:

FIG. 1 a cross-section through a slide control valve,

FIG. 2 a section turned through 90° in the plane II—II of FIG. 1,

FIG. 3 is a section corresponding to FIG. 2 in a plane III—III of FIG. 1,

FIG. 4 a diagrammatic illustration of a hydraulic control arrangement with a slide control valve according to FIGS. 1 to 3 and a position- or load limiting device.

According to FIGS. 1 to 3 the slide control valve consists of a housing 2 having a housing bore 3, which passes through the housing 2 and at both ends is in communication with a pressure medium reservoir 4 or also a return-flow pipe. A piston slide 5 is displaceable within the housing bore 3 from the indicated neutral position into first and second control positions (I,II). Its two ends are denoted by 6 and 7. They form control edges, the purpose of which will be explained hereinafter. An actuating rod 8 acts if necessary for the rotational security of the piston slide in the housing bore and mainly for its adjustment. The openings 9 passing through the housing are used for securing the housing or for the connection of the slide control valve to other slide control valves. A pump supply P discharges into an inlet 10 in the housing bore 3 which inlet in relation to the longitudinal axis of the housing bore 3 lies at all times opposite to and laterally displaced from the user connections VI, VII of which the openings 11, 12 are arranged diametrically opposite to the recesses 18, 20 in the housing bore.

Flow pockets 13, 14 extending longitudinally in the piston slide 5 are connected to through-flow bores 15 for the transmission of pressure medium. A bore 16 traverses the piston slide 5 in the same plane containing the pump supply opening 10 and the user connections VI, VII, and is arranged for an unrestricted through flow. Further through-flow bores 17, 19 (broken lines) are formed in the piston slide, which in the neutral position illustrated in FIG. 1 are aligned with the openings 11, 12 of the user connections VI, VII for the purpose of ensuring a pressure balance of the piston slide connected to the recesses 18, 20. Circumferentially-extending, pressure-balancing grooves 21 are arranged in the wall of the housing bore 3, which are provided to ensure the exhaust of pressure pockets between the outer periphery of the piston slide and the wall.

From FIGS. 2 and 3 it is clearly apparent that bores 22, 23 pass through the housing 2 and discharge into the housing bore 3, and for example extend parallel to the bore 16. The discharge opening of the bore 22 lies in a zone of the housing bore 3, which is closed by the ends 6 of the piston slide 5; this cross-hatched area indicated by 25 has no interruption in its periphery and so closes the discharge opening of the bore 22 during an adjustment movement into the control position I from the neutral position N. Conversely the discharge opening of the bore 23 is opened during a movement into the control position II. At all times the auxiliary control passages 24a, 24b are connected to the bores 22, 23. A passage D is apparent in FIGS. 2 and 3 which serves for unrestricted through flow.

The slide control valve according to FIGS. 1 to 3 operates as follows:

In the indicated neutral position the pump supply connection P communicates the working medium pressure to the flow pockets 13, 14 so that the piston slide is here pressure compensated. Since the bore 16 is aligned with the passage D, pressure medium can flow through unrestricted. The user connections VI and VII are in communication through the flow bores 17, 19 in the slide with the recesses 18, 20, so that—in case a working pressure arises here—the piston slide is here likewise pressure balanced. The discharge openings of the bores 22, 23 are closed, so that in the auxiliary control passages 24a, 24b a pressure is built up, which can be used for the pre-control of an auxiliary valve, not shown. The two ends of the housing bore 3 are relieved of pressure into the reservoirs 4.

As soon as the piston slide 5 is displaced from the indicated neutral position into the control position I, the unrestricted flow through passages D and bore 16 is interrupted so that the pressure at the pump supply P increases. As soon as the front edge (see FIG. 1) of the left-hand bore 15 passes in front of the discharge opening 11, a flow connection is provided from the pump supply inlet 10 to the user connection VI. The discharge opening of the bore 22 remains closed. Simultaneously, the discharge opening 12 is uncovered by the end 7 of the piston 5, so that a communication from the user connection VII to the right-hand end of the housing bore 3 is provided and pressure medium can flow out from the user connection VII into the right-hand reservoir 4 or to a return flow connection not shown. Soon after the uncovering of the discharge opening 12, an uncovering of the opening of the bore 23 takes place, so that also the pressure arising here in the auxiliary control pipe 24b is exhausted. The thus produced pressure pulse can be used for the release of the control function. It must, however, not be so used.

On the return motion of the piston slide 5 into the neutral position according to FIG. 1 the condition hereinbefore described applies, whilst on a further displacement of the piston slide 5 into the second control position II the flow connection between the pump supply and the user connection VII is effected and the user connection VI is connected to the left-hand reservoir 4 or to a return flow connection not shown. By this movement the discharge opening of the bore 23 is covered, whilst in the further sequence the discharge opening of the bore 22 is uncovered and here once again exhausted from the auxiliary control connection.

The pressure pulse thereby arising in the auxiliary control passage can be used for initiating the control function; it must not, however, be so used.

The uncovering of the discharge openings of the bores 22, and 23 is effected just before the piston slide passes into the control position. This is achieved in that the spacing S1 between the discharge opening of the bore 22, (23) and the corresponding end of the piston slide 5 is smaller than the spacing S between the discharge opening 11(12) and the corresponding end of the piston slide 5. For the sake of clarity these different spacings S1 and S are used as references for the corresponding ends of the piston slide when it is in the neutral position. It can also be stated that the discharge openings of the bores 22, 23 lie closer to the respective ends of the housing bore 3, than the discharge end openings 11, 12 of the user connection VI and VII. The spacings S1 and S can be made equal in special cases of use so that the pressure release for the bores 22, 23 is effective synchronously with the pressure release of the user connections VI and VII.

It is also possible without further measures to connect several bores 22, 23 with corresponding bores at different distances from the ends of the housing bore 3 in the housing and then to connect thereto various auxiliary control channels. This would be appropriate in that the pressure release of these auxiliary control channels is effected at various piston slide locations. It is possible thereby to effect control functions at various points in time.

The bores 22, 23 can moreover, be incorporated in the housing wherever sufficient space is provided therefor, where it can be ensured that the piston slide has during its adjustment movement a field peripheral zone, which ensures the uncovering of the discharge opening of any given bore only at a predetermined point in time.

In FIG. 4 a hydraulic control device is schematically illustrated for a double-acting hydraulic cylinder 29, of which the working pressure actuation is controlled through the control valve 1 with its piston slide 5, and a position limiting or a load-limiting control being provided at the same time, which occurs in dependence upon the movement of the cylinder 29 and of the piston slide 5 for its operation.

The piston slide 5 of the control valve 1 is here symbolically illustrated; in this respect it is to be stated that the opening in the housing connecting the bore with the reservoirs 4, or a return flow passage (not shown), is indicated in broken lines 4' which are connected to the return flow passage 31. The slide control valve 1 is supplied with pressure medium from a pump P, which is connected with a main supply pipe 30, which leads to the connection in the slide control valve 1 and simultaneously is fed to an auxiliary valve 33, which is constructed as a slide changeover valve and interrupts in its illustrated switch position a flow between the main supply pipe 30 and the pipe for the unrestricted flow through passage D. The return flow pipe 31 leads from the passage D to a pressure medium reservoir. Between the main supply pipe 30 and the return flow pipe 31 there is, furthermore, provided an adjustable pressure regulator 32, which controls the level of the working pressure in the main supply pipe. The pre-control pipe 34 branches from the main supply pipe 30, to actuate the slide of the auxiliary valve 33 in the direction towards the opening of the valve. A further pre-control pipe 36 leads through a throttle 35 to the opposite end of the slide of the auxiliary valve 33 and actuated this in the direction towards the closed position of the valve. A spring 44 acts in the same direction on the slide. To the pre-control pipe 36 there is connected the auxiliary control pipe 24, which for example is fed to the bore 22 (see FIGS. 1 to 3) in the housing of the slide control valve 1. In this control device the bore 23 is unnecessary, and is in a conventional is blocked off by a closure plug (not shown).

A further auxiliary or protecting valve 38 is provided between the two branches of the auxiliary control pipe 24. Said valve 38 is a slide changeover valve with two positions. In the shown position (FIG. 4) the valve 38 interrupts the flow between the two branches of the auxiliary control pipe 24. The slide of the valve 38 is preloaded by a spring 41 in its moving direction towards the closure position of the valve 38. In the moving direction towards the open position of the valve 38 a signal pressure in pipe 39 can act on the slide of valve 38, which signal pressure can displace the slide into the open position of the valve 38 when reaching a certain pressure value.

The control device according to FIG. 4 operates as follows:

In the illustrated neutral position of the piston slide 5 the pressure medium supplied by the pump P flows through the passage D directly into the return flow pipe 31 and from this into the reservoir R. No appreciable working pressure is built up. The spring 40 holds the auxiliary valve 33 in its closed position, whilst the spring 41 holds the auxiliary valve 38 in its closed position. Within the cylinder 29 pressure builds up at both sides of its double-acting piston.

In the illustrated embodiment at pipe 39 the signal pressure from the working pressure pipe 27 is measured for the cylinder 29. This pipe 27 is connected to the consumer connection VII (FIG. 1) of the slide control valve 1. With pressure in pipe 27 the piston rod of the cylinder 29 is forced to travel outwardly. During such movement of the piston rod pipe 28 is vented via the control valve 1. As soon as pipe 28 which is connected to the consumer connection VI of the slide control valve 1 is pressurized by actuation of the control valve 1 the piston rod of the cylinder 29 will be retracted and pipe 27 is then vented via the control valve 1.

As soon as the piston slide 5 in FIG. 4 is displaced upwardly into its control position I, the passage D through the piston slide is interrupted and pressure builds up in the main supply pipe 30 under control of the pressure regulator 32, which finally is connected to the inlet 10 to the piston slide. As soon as the piston slide 5 lies in the control position I, the working pressure pipe 28 is subjected to pressure, whilst from the working pressure pipe 27 presure medium flows out into the return flow pipe 31. The piston rod of the cylinder 29 is retracted.

From the build up of pressure in the main supply pipe 30 also a pressure build up at both ends of the slide within the auxiliary valve 33 results. Since the built up pressure acts on both side of the slide in the auxiliary valve 33 this valve will be kept in its closed position (FIG. 4), assisted by the force of spring 40. Since in this control position I pressure medium can flow out of the working pressure pipe 27, the pressure in pipe 39 does not increase sufficiently so that it cannot switch the auxiliary valve 38 into the open position. The auxiliary valve 38 thus remains in its closed position (FIG. 4). Since the discharge opening of bore 22 (see FIG. 1) remains covered in this position of the slide in the main slide control valve 1, the branch of the auxiliary control pipe 24 extending between the auxiliary valve 38 and the main control valve 1 is not relieved of pressure. The actuation of the cylinder 29 can be achieved without actuation of auxiliary protecting valve 38, i.e., the auxiliary protection valve 38 does not supervise the actuation of the working cylinder 29 in this working direction.

As soon as the main slide control valve (1) is switched into its second control position II, pressure is built up in the main supply pipe 30 and via the piston slide (5) also in the working pressure pipe (27). The piston rod of the cylinder (29) is forced outwards. At the same time the pressure medium can flow out of the working pressure pipe (28) via the piston slide (5) into the return flow pipe (31). In the control position II the discharge opening of the bore (22) is opened towards the piston slide bore. In FIG. 4 this is indicated by the broken line channel (37) in the upper portion of the piston slide. The flow connection between the piston slide bore and the return flow pipe (31) through the pipe (4') is instituted. The branch of the auxiliary control pipe (24) extending between the auxiliary protection valve (38) and the piston slide (5) will be relieved of pressure. A pressure pulse thereby generated in this branch of the auxiliary control pipe (24) has no effect for the auxiliary valve (33) since the auxiliary protection valve (38) is still in its closed position.

If in the control position II the piston rod of the working cylinder (29) hits an obstacle the pressure in the working pressure pipe (27) exceeds a predetermined value, which indicates an overload condition or that an overload limit is reached. The signal pressure in pipe (39) then becomes high enough to actuate the slide of the auxiliary protection valve (38) and switches it into its open position.

Therewith the branch of the auxiliary control pipe (24) extending between the auxiliary valve (33) and the auxiliary protection valve (38) is released from pressure. The pressure pulse thereby produced relieves the slide of the auxiliary valve (33) at the side of the spring (40), so that the pressure in the control pipe or pilot pipe (34) displaces the slide and switches the auxiliary valve (33) to its open position. Thereby a prompt communication between the main pressure supply pipe (30) and the return flow pipe (31) is effected. In the main pump connection pipe (10) no working pressure then is available; no further pressurization of the working pressure pipe (27) and no displacement of the piston rod of the cylinder (29) in this direction is possible. The throttle (35) prevents a rapid flow from the main supply pipe (30) into the first branch of the auxiliary control pipe (24). The auxiliary valve (33) remains so long in its open position, as at pipe (39) a certain signal pressure acts which holds the auxiliary protection valve (38) in its open position.

The piston in the working cylinder (29) then has to be moved into the opposite direction by switching the main slide control valve (1) again into its control position I.

In place of a load dependent signal pressure at pipe 39 in addition a mechanical, electromagnetic or hydraulic changeover on the auxiliary valve can be provided, so that the control function then derived from the pressure loading of the auxiliary control pipe 24 is not load dependent, but for example, dependent upon a stroke adjustment.

Thereafter the discharge opening of the bore 22 is closed with the piston slide 5. The pressure medium in pressure control pipe 24 can no longer be vented to the return pipe 4'. From the main pressure supply pipe 30 through the pipe 36 and the throttle 35 the pressure in the auxiliary pipe 24 builds up so far that the auxiliary valve 33 can return into its closed position. Then the control device is again completely ready for use and cylinder 29 can be actuated to retract the piston rod. At all times on achieving a load limit the pressure pulse of the auxiliary control pipe 24 will again be used in such a manner that the exceeding of the load limit will be prevented.

In a conventional manner also several such slide control valves 1 can be arranged in series so that a continuous passage for the unrestricted flow is provided and all slide control valves are supplied from the pumpe P with working pressure. Each slide control valve can then control one hydraulic cylinder. The hereinbefore mentioned safety function of the control function can be extended to any of the control hydraulic cylinders, if branch pipes from the auxiliary control pipe 24 lead to correspondingly arranged bores which on achievement of a load or location limit of the cylinder actuated at any given time leads to the pressure release of the auxiliary control pipe 24 and at this limit no further adjustment movement leading to an excess of this boundary or overloading of the cylinder can take place.

I claim:

1. A hydraulic control device for a hydraulic working cylinder, comprising a slide control valve, in which the flow of working pressure medium through first and second user flow passages is controllable by corresponding control edges of a piston slide displaceable from a home position within a housing bore into opposed control positions, said piston having flow control edges, (6,7) at least one auxiliary control passage connected to the housing of the slide control valve, said control passage having a control bore (22,23) discharging into a longitudinal section of the housing bore which is swept by one of the control edges of the piston slide when said one control edge is being presented in controlling position to the related user flow passage for controlling the direct working pressure medium flow through that flow passage during movement of the piston slide between opposed control positions, the control bore being spaced from each user flow passage and so positioned that during movement of the piston slide into a selected control position the control bore is uncovered by the related control edge of the piston slide and the control bore is thereby communicated to the housing bore but not later than said control edge being presented in control position to the related user flow passage, and the control bore also being so positioned for closure thereof when the piston slide is in home position which in itself is adapted for the control of the working pressure medium flow from or to the working cylinder.

2. A hydraulic control device according to claim 1, wherein said control bore, in relation to the longitudinal direction of the housing bore, is so positioned that it is partly uncovered by the piston slide moving toward a control position prior to the related control edge of the piston slide being presented to the related flow passage.

3. A hydraulic control device according to either claim 1 or 2 in which the slide control valve has two outputs, in which the piston slide is displaceable from a neutral position into either of two control positions corresponding to the output, another user outlet in the housing bore connected with a return flow passage, the piston slide having at both ends a respective control edge, and a pair of auxiliary control passages having control bores leading into the housing bore so positioned to discharge into the housing bore that during displacement of the piston slide to one control position the adjacent control bore remains covered while the other control bore is opened.

4. A hydraulic control device according to claim 3, wherein the piston slide has flow pockets and through flow passages for flow of the pressure working medium together with an unrestricted passage for pressure balance on the piston slide itself, the control bores of the auxiliary control passages being arranged to discharge into a peripheral zone of the housing bore, in which during the axially extending movement of the piston slide the peripheral section of the piston slide (25) extending in the longitudinal direction thereof between the pockets and the discharge openings of the through flow bores closes off the control bores in a sealing manner until opened upon movement of the piston slide opening.

5. A hydraulic control device according to claim 1 having at least two auxiliary control passages with control bores opening into the housing bore, with the control valve arrangement connected to a common main supply pipe consisting of several adjacent auxiliary slide control valves each actuatable by at least one hydraulic cylinder, and a common auxiliary control pipe being provided having branch pipes leading at any given time to one control bore in the housing of the slide control valve so that on uncovering of a control bore by the piston slide the auxiliary control pipe is totally released from pressure.

6. A hydraulic control device according to claim 1 comprising an overload protection device for the hydraulic working cylinder, said overload protection device containing at least one auxiliary protection valve (38) which is actuatable by a signal pressure into a through flow position, said signal pressure being derived from the working pressure of the working cylinder, said auxiliary protecting valve being connected to the main slide control valve, characterized by a pipe connection between the main supply pipe (30) and the return pipe (31,4), from which pipe connection the auxiliary control pipe (left branch 24, 36, FIG. 4) branches and in which pipe connection a first auxiliary valve (33) in the form of a two position change over valve is provided, which is held by the pressure in the branched auxiliary control pipe (24, 36) of the pipe connection against a predetermined control pressure in its first and closed position, said predetermined control pressure corresponding to the pressure in the auxiliary control pipe (24), the auxiliary control pipe (36,24) being connected via the auxiliary protection valve (38) with the bore (22), and that the bore (22) is releasable or ventable by means of one end of the piston slide in the main control valve (1) as soon as the piston slide is displaced into one of its control positions, in which one control position the working pressure medium flow to the hydraulic cylinder would cause an overload condition in the hydraulic cylinder, against which the hydraulic cylinder must be protected, and that in the one control position of the piston slide via the auxiliary protection valve (38) and the bore (22) the pressure in the branched auxiliary control pipe (24,36), which holds the auxiliary valve (33) closed, is vented to tank via pipe (4'), so that the predetermined control pressure in pipe (34) switches the auxiliary valve (33) into its second and open position in which the pipe connection between the main supply pipe (30) and the return pipe (31,4) is unblocked and the working pressure for the hydraulic cylinder is dropped.

* * * * *